United States Patent [19]

Letocquart

[11] Patent Number: 4,568,942
[45] Date of Patent: Feb. 4, 1986

[54] MICROWAVE LANDING SYSTEM WITH SEPARATE ELEVATION BEARING STATIONS

[75] Inventor: Bruno Letocquart, Paris, France

[73] Assignee: Thomson-CSF, Paris, France

[21] Appl. No.: 417,252

[22] Filed: Sep. 13, 1982

[30] Foreign Application Priority Data

Dec. 18, 1981 [FR] France .................... 81 23733

[51] Int. Cl.$^4$ ............ G01S 1/16; G01S 1/18
[52] U.S. Cl. .................. 343/408; 343/5 LS
[58] Field of Search ........... 343/408, 372, 373, 6.5 R, 343/5 LS

[56] References Cited

U.S. PATENT DOCUMENTS 3,775,766 11/1973 Gendreu et al. .......... 343/5 LS
4,454,510 6/1984 Crow .................. 343/5 LS

OTHER PUBLICATIONS

B. Letocquart, "The MLS in France", *Microwave Journal*, vol. 24, No. 5, (1981), p. 113.
G. Onodera et al., "Development of Approach Elevation Equipment in MLS", *NEC Research and Development*, No. 59, Oct., 1980, p. 34.
R. M. Cox et al., "MLS-A Practical Application of Microwave Technology", *IEEE Trans. Mic. Theory and Tech.*, vol. MTT-24, No. 12, Dec. 1976, p. 964.
S. J. Robinson, "MADGE-A Portable Aid for Aircraft Landing", *Microwave System News*, vol. 5, No. 2, Apr.-/May 1975, p. 16A.

Primary Examiner—Theodore M. Blum
Assistant Examiner—John B. Sotomayor
Attorney, Agent, or Firm—Pollock, VandeSande & Priddy

[57] ABSTRACT

The invention relates to a microwave landing system or MLS in which the bearing station and elevation station are geographically separated by a distance which can be several kilometers. Each of the elevation and bearing stations transmits a message constituted by a preamble identifying the nature of the following angular message. According to the invention, one of these stations is made the master station and the other becomes the slave station. Thus, one station, i.e. the master station transmits the preambles of both messages, the slave station now only transmitting its specific angular information.

9 Claims, 10 Drawing Figures

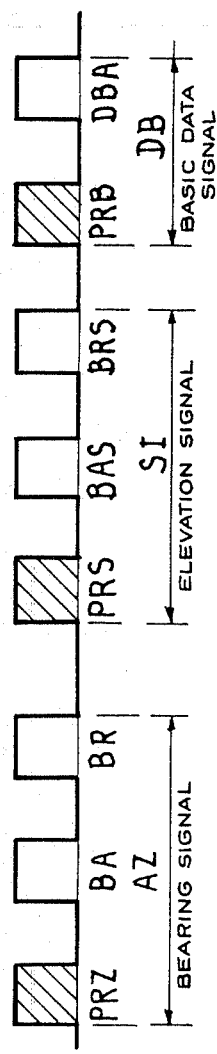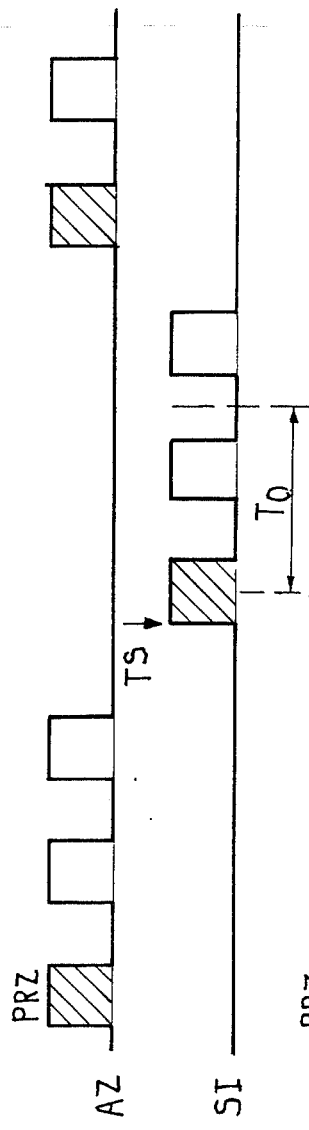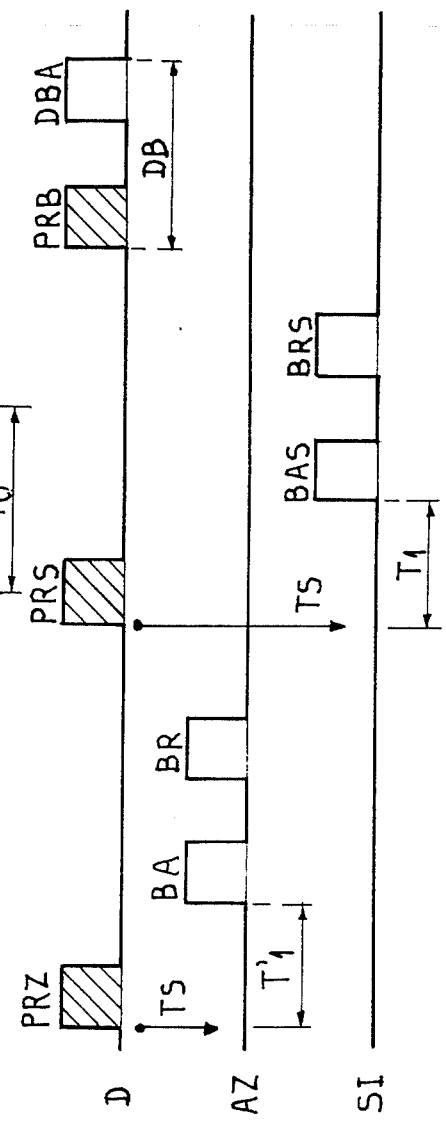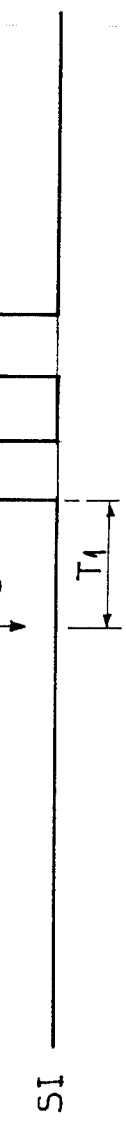
FIG.10a FIG.10b1 FIG.10b2 FIG.10d1 FIG.10d2 FIG.10d3

MICROWAVE LANDING SYSTEM WITH SEPARATE ELEVATION BEARING STATIONS

BACKGROUND OF THE INVENTION

The present invention relates to microwave landing systems (MLS) with separate elevation and bearing (or azimuth) stations.

As is known, the international civil aviation organization (ICAO) has adopted the microwave landing system as a successor to the instrument landing system (ILS) as the landing aid to be used throughout the world in the next decade.

Hereinafter, reference is made to the principle of the MLS. It supplies the aircraft with its position in spherical coordinates in a reference mark linked with the runway, i.e. the elevation angle and bearing angle. The distance of the aircraft is supplied by auxiliary distance measurement equipment (DME) which operates at a different frequency.

The elevation and bearing angles are transmitted on the same frequency of approximately 5 GHz by ground stations close to the runway and a suitable receiver makes it possible to measure these angles on board the aircraft using the system. The elevation and bearing angles are transmitted on a time sharing basis on the same carrier frequency and the measurement is of the anametric type, i.e. it is performed on board various aircraft using the system and this takes place in an independent manner on the basis of a ground transmission.

Each bearing or elevation station, whereof a block diagram is given in FIG. 1, comprises a transmitter 1 with an antenna switch 16 controlled by an electronic control device 2 and an internal monitor 3 checking the quality of the transmission, an electronic scan antenna 4 and a sector antenna 5, an external monitor 6 also being provided for checking the quality of the transmitted signal. The elevation or bearing angular information is produced by a narrow fan-shaped beam 11 along the angular coordinate in question scanning on an outward and return basis the complete angular sector of the coverage at a constant angular velocity V and the angular position of an aircraft is determined on board by measuring the time interval between the reception of the passages of the outward beam and the return beam. This time interval is a linear function of the angular position of the aircraft and the angular information $\theta$ is equal to $V/2 (To-T)$, in which V is the constant angular velocity of the scan of the angular sector considered by the beam of the antenna, T the time interval between the reception of the outward and return passages of the beam and To the value of the time interval T for a zero angle $\theta$. To and V are constants defined by international standards on MLS. Each elevation and bearing angular coordinate is transmitted with the aid of a specific antenna in this system. Thus, there are at least two preferably electronic scan antennas in an MLS. The transmissions on the elevation and bearing antennas are multiplexed in time, together with the identification information and various data on the system, which are transmitted throughout the volume of the angular coverage by sector antennas.

FIG. 2 shows the principle of angular measurement, as described hereinbefore, in the case of a bearing angle.

FIG. 2a shows the scan of the outward beam designated 11 and having as its origin a point A close to the end of the runway, which is the location of the antenna which produces it. Minor lobes are shown in addition to the major lobes forming the narrow measuring beam. It is assumed that beam 11 passes at a given time on aircraft AF. On referring to FIG. 2c which represents the signal S obtained as a function of time, it can be seen that signal S1 given by the outward beam appears at a time t1 and that it exceeds a predetermined measuring threshold SM. In the right-hand part of FIG. 2 it is possible to see the return beam 110, which obviously has the same origin A as the outward beam 11. Signal S2 appears in FIG. 2c at time t2, when return beam 110 passes on aircraft AF. It is pointed out that, by convention, time t1 and/or t2 corresponds to the middle of the signal received S1 or S2. Thus, this time can easily correspond to the middle of the width of the considered signal at $-3$ or $-6$ dB compared with its maximum value. Time 0 at the time origin corresponds to the start of the outward scan of the beam, while time t3 corresponds to the end of the return scan. The time interval separating t2 from t1 is equal to T. A scan stop dead time TM is observed between the end of the outward scan and the start of the return scan.

FIG. 3 shows the principle of the multiplexing of functions in time for a complete MLS station. Part (a) shows how the stations are arranged with the elevation station 7 located close to the starting threshold of the runway and the front bearing station 8 close to the end of the runway. FIG. 3a also shows a rear bearing station 9 close to the starting threshold 100 of runway 10, but this station is not currently used.

Part (b) of FIG. 3 shows the information transmitted by the aforementioned stations on a time sharing basis on the same frequency. The bearing station 8 supplies the front bearing information AZ, as well as the basic data DB and auxiliary data DA, while the elevation station supplies elevation information SI. Part (c) of FIG. 3 shows in greater detail and as a function of time, the information specified in part (b). The front bearing information AZ consists of a preamble PRZ, the outward scan being BA and the return scan BR. The main function of the preamble is to give the elevation or bearing identity of the transmission which immediately follows. Thus, the elevation information SI also has a preamble PRS, an outward BAS and a return scan BRS. The basic data DB also consists of a preamble PRB and the actual data DBA. The same situation as for the basic data applies to the auxiliary data, but they are not shown in FIG. 3c. Obviously, both FIGS. 3b and 3c are arranged relative to time t, whose axis is represented by ot.

It is pointed out that the basic data are considered to be data which are operationally indispensible for landing an aircraft on the runway. The auxiliary data are supplementary data for special operations. For example, the basic data supply the aircraft with information on the geometry and characteristics of the landing system. These data are transmitted by sector antenna 5 and the corresponding signal consists of a preamble PRB and the actual data transmitted in differential phase modulation DPSK.

It is pointed out that the main function of the preamble is to give the bearing or elevation identity of the directly following transmission. A preamble is transmitted by a sector antenna 5 serving the complete coverage of the system. This preamble is generally coded in differential phase modulation (DPSK for differential phase shift keying). The angular information is transmitted by an electronic scan or scanning beam antenna 4.

In practice, for operational reasons, the elevation and bearing stations are several kilometers from one another and, as stated hereinbefore, the bearing station is close to the end of the runway and the elevation station close to the start of the runway. It is pointed out that these notions are relative to the landing direction of aircraft and if the runway is equipped in both directions, there are two totally independent elevation and bearing microwave landing systems. Operation on a single frequency with time sharing consequently imposes a synchronization connection in time between the two stations. Thus, it is necessary to have for each elevation or bearing station a sector antenna and an electronic scan antenna, the sector antenna of a station transmitting the preamble of the corresponding function.

Thus, as a sector antenna is required for each elevation and bearing station, there is a duplication of certain costly elements for a complete system.

BRIEF SUMMARY OF THE INVENTION

The invention proposes to reduce the complexity resulting from this duplication, as well as the cost, for particularly the elevation station, by transmitting the preambles of the elevation and bearing functions, as well as the basic data by means of the same sector antenna, namely the sector antenna of the bearing station.

An immediate advantage resulting from the invention is that in the case of the elevation station at least the sector antenna, antenna switch and phase modulator are eliminated. It should be noted that the preambles can equally well be transmitted by the elevation sector antenna, in which case it would be the bearing station which would be made less complex and less costly.

The present invention therefore relates to a microwave landing system with separate elevation and bearing stations supplying an aircraft with its position in spherical coordinates, namely the bearing angle and elevation angle, in a reference mark linked with the runway, by transmitting a bearing message and a elevation message, each of which has a preamble giving the identity of the following message and the actual angular information message, wherein only one of the two stations transmits, apart from its specific message, the preamble of the specific message of the other station, the transmission of this preamble being associated with the transmission of a synchronization signal intended for the transmitting station and then angular information message corresponding to said preamble.

BRIEF DESCRIPTION OF THE DRAWINGS

The invention is described in greater detail hereinafter relative to non-limitative embodiments and the attached drawings apart from FIGS. 1, 2 and 3 relating to the prior art, wherein show:

FIG. 10 a time-based representation of the signals transmitted according to the invention when using three stations.

DETAILED DESCRIPTION OF THE PREFERRED EMBODIMENTS

As has been shown hereinbefore, it is normal in the case of a microwave landing system or MLS in which the elevation and bearing stations are spaced in many cases by several kilometers, for each station to transmit by a sector antenna the preamble of the elevation or bearing message which it transmits to aircraft using the system and which by means of measurements carried out on board, are able to position the aircraft relative to the ground and more specifically relative to the runway.

It has also been seen that each station, in order to fulfill its function, must comprise an electronic scan antenna and a sector antenna, a transmitter, a control electronics, an external monitor and internal monitor. The transmitter comprises the following elements, a frequency generator of approximately 5 GHz, a zero-$\pi$ phase modulator for generating the messages coded in the DPSK phase of the preamble, a power amplifier and an antenna switch for branching the power of the transmitter either to the sector antenna transmitting the preamble or to the electronic scan antenna transmitting the corresponding angular information, as a function of the times of the time sequence adopted.

It is necessary to add to the aforementioned a time synchronization connection between the two stations for ensuring that the elevation and bearing transmissions do not overlap, because the elevation and bearing stations operate on the same frequency and on a shared time basis.

In order to eliminate costly equipment in one of the two stations, which reduces the complexity of the station in question, the present invention proposes that only one of the two elevation and bearing stations should transmit the preambles of the two elevation and bearing messages, while the other station only transmits its specific angular scan information. As stated hereinbefore, this makes it possible to eliminate from the station which now only transmits the angular scan information, the sector antenna for transmitting a preamble, the phase modulator for coding this preamble and the antenna switch for passing the angular scan information from the sector antenna to the transmitting electronic scan antenna. However, the simplification of one of the stations does not lead to a corresponding increase in the complexity of the other station, which in fact undergoes few changes. Only the synchronization connection between the two stations must be more specific, because its function is no longer to simply ensure that there is no overlap between the elevation and bearing functions and instead it must also ensure a correct value for the time interval To separating the two following events:

time reference to the preamble which, by convention, consists of the final transition 0-1 of the Barker code 11101;

middle of the outward and return scans defined in the elevation electronic scan antenna in the case where the site preamble is transmitted by the bearing sector antenna.

Figure 4:
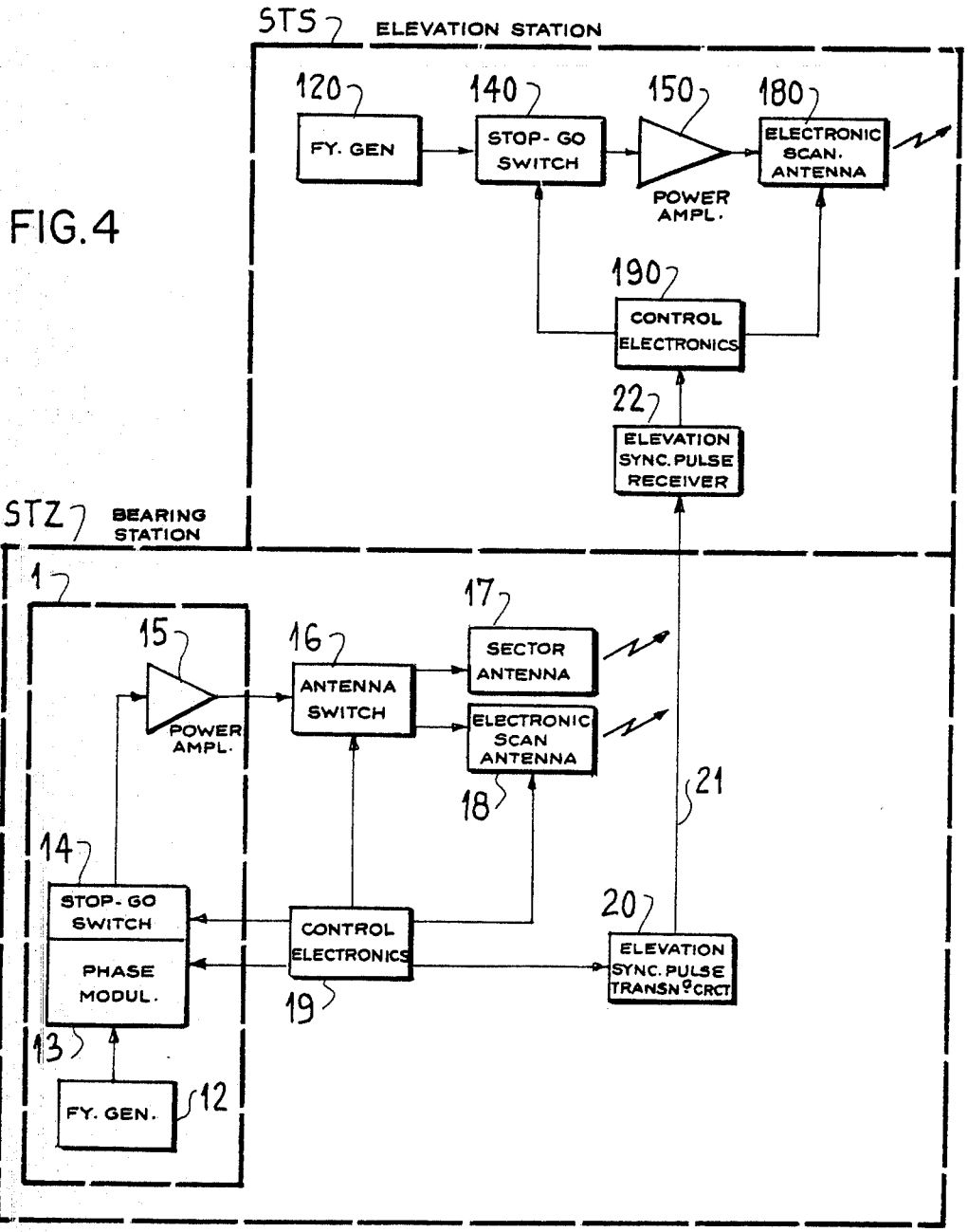
FIG. 4 is a schematic diagram of the system according to the invention.

FIG. 4 shows the schematic diagram of the landing system according to the invention. In order to facilitate the following description, it is pointed out that the bearing station has been chosen to transmit the preambles of the elevation and bearing functions, but it would also have been possible to choose the elevation station in its place.

FIG. 4 very diagrammatically shows the bearing station STZ and elevation station STS. Station STZ comprises a frequency generator 12 of e.g. 5 GHz supplying a phase modulator 13 with a stop-go switch 14, a power amplifier 15 connected to an antenna switch 16 ensuring the putting into operation of a sector antenna 17 or an electronic scan antenna 18, which in the present embodiment is of the bearing scan type. The order of elements 13-14-15 is not imperative and a different construction can adapt to a different order. A control electronics 19 checks the different elements referred to hereinbefore. This control electronics also controls a circuit 20 transmitting an elevation sync pulse, which is transmitted by a sync connection 21 to the elevation station STS of the system.

The latter comprises a frequency generator 120 of 5 GHz identical to that of the bearing station STZ connected to a stop-go switch 140 followed by a power amplifier 150 connected to an elevation electronic scan antenna 180, a control electronics 190 checking the stop-go switch 140 and the electronic scan antenna 180. The control electronics is connected to a sync receiver 22, connected by connection 21 to transmitter 20 of the elevation sync signal belonging to the bearing station STZ. These three elements 20-21-22 constitute the bearing-elevation synchronization device.

In a number of points, the operation of such a system is similar to that of prior art systems, as described in the following articles:

Le MLS un example d'utilisation du microprocesseur, by B. LETOQUART and J. M. Skrzypczak, published in the Journal "Navigation", April 1981;

The MLS in France, published in the Journal "Microwave Journal", May 1981, pp. 113 to 120.

Figure 1:
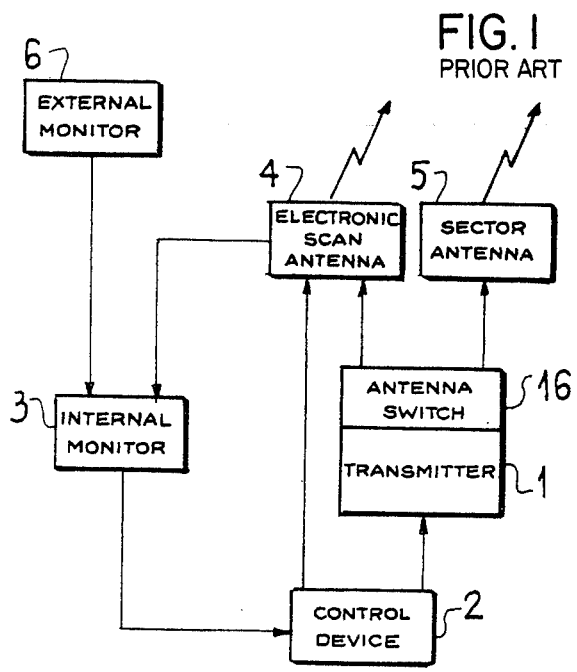

In actual fact, in bearing station STZ, the transmitter assembly comprising generator 12, phase modulator 13 with stop-go switch 14 and power amplifier 15, as well as antenna switch 16 has not been modified compared with the prior art transmitter assembly 1 of FIG. 1. Moreover, transmitting the preamble of the bearing function, it is able to transmit the elevation preamble under the control of the control electronics 19, which is modified compared with the control electronics of FIG. 1, at least with regard to its device for bringing about the time sequencing of the different operations to be performed. As a general rule, such a sequencing device is a microprocessor, which, according to the invention, is modified in order to add thereto the generation of the elevation message preamble. These modifications lead to the generation of the elevation preamble in the DPSK phase modulator 13 and the control of the antenna switch 16. By convention, the structure of the elevation preamble is the same as that of the bearing preamble, to within the identification message DPSK of 1100001 for the elevation, 0010100 or 0011001 for the bearing. However, according to the invention, the transmission of the elevation preamble by the sector antenna of the bearing station is not followed in the latter by the transmission of the elevation angular scan information, which is ensured by the elevation station after receiving a sync pulse. In the case where the sequencing device is a microprocessor, the transmission of the two preambles by the same sector antenna leads to the use of the same program modified in the following way. To the transmission times of the elevation preamble PRS are added the instructions generating this preamble. As the preambles PRZ and PRS are identical, to within the identification message DPSK as indicated hereinbefore, these instructions are the same for both the preambles PRS and PRZ, to within a storage location containing the elevation identification message (1100001) in place of the bearing identification message (0010100 or 0011001).

Figure 2A:
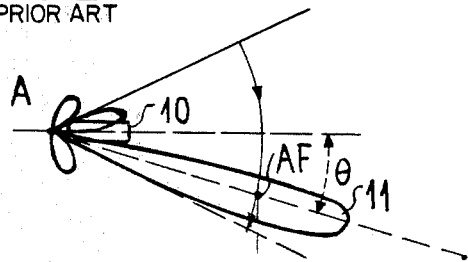
Figure 2B:
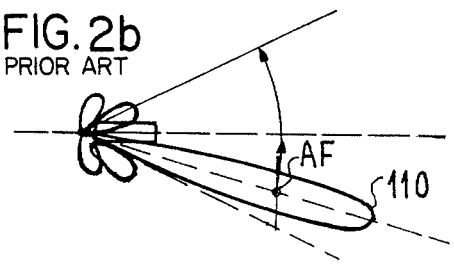
Figure 2C:
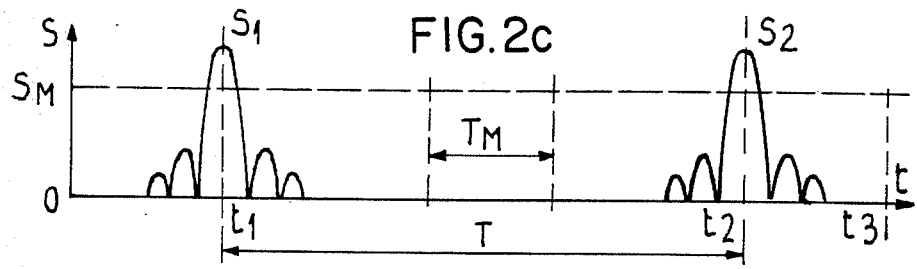
Figure 5:
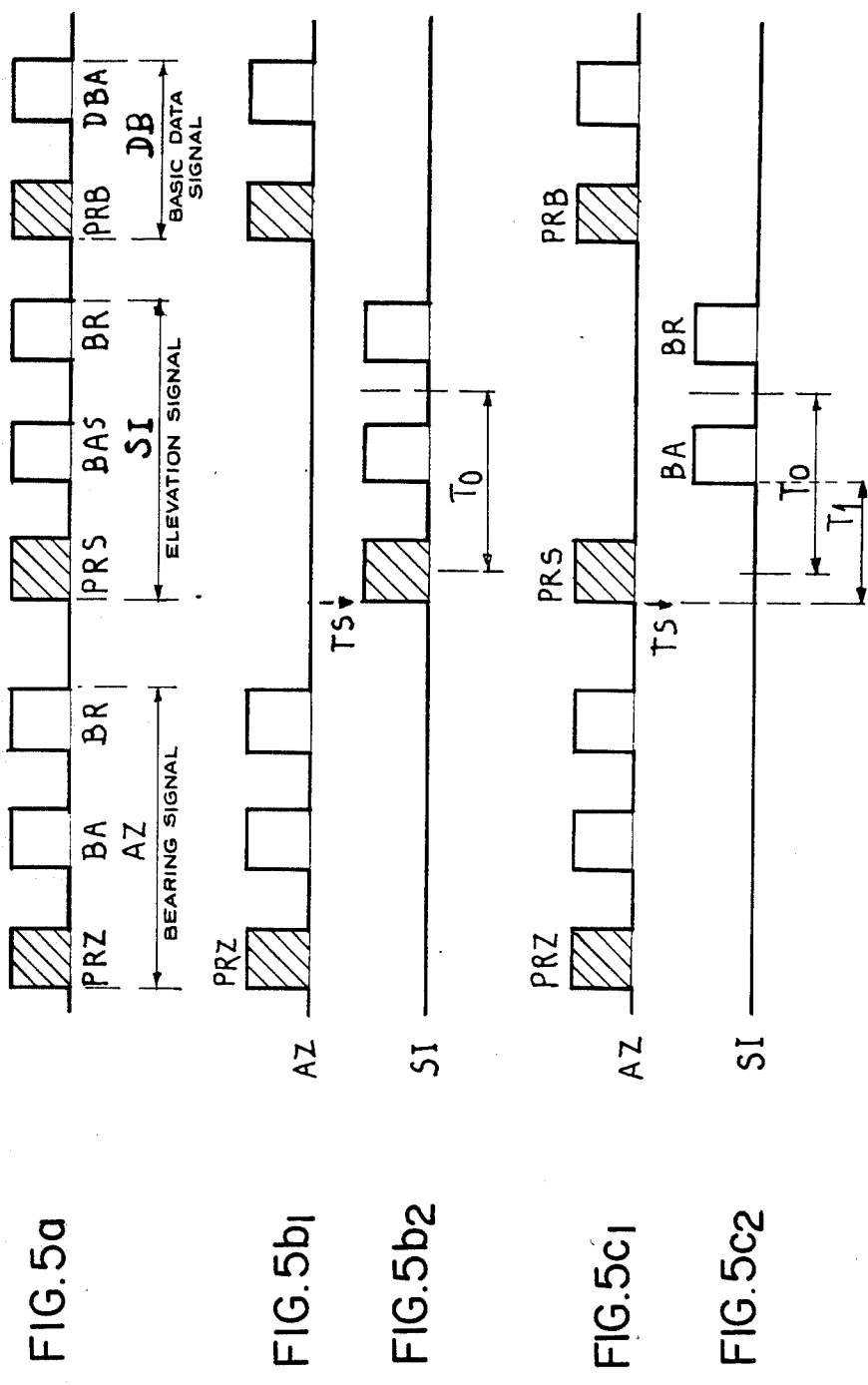
FIG. 5 a time-based representation of the signals transmitted by the MLS.

FIG. 5 is a time-based schematic representation of the different signals transmitted by the stations of a microwave landing system. FIG. 5a shows the complete signal in space, the bearing signal AZ including preamble PRZ and the angular information imaged by the outward scan BA and return scan BR, followed by the elevation signal SI with preamble PRS and outward scan BIS and return scan BRS, followed in the general case of the basic data signal DB with preamble PRB and basic data DBA. FIG. 5b shows the signals transmitted by the bearing and elevation stations according to the prior art. FIG. 5b1 shows the signal AZ transmitted by the bearing station with the synchronizing pulse TS determining the time at which the elevation station starts to transmit its message (FIG. 5b2). The indicated time To is information internal to the elevation station.

FIG. 5c shows the signals AZ and SI respectively transmitted by the bearing station 5c1 and elevation station 5c2 according to the invention. It can be seen that the bearing station transmits the preamble of the elevation message. The time To is defined as the time interval separating the two following events:

time reference of the preamble constituted, by convention, by the final phase transition 0-1 of the Barker code and 11101;

middle of the outward and return scans of the electronic scan antenna in question, which is in this case the elevation scan antenna.

The bearing-elevation synchronization device 20-21 and 22 must be able to very accurately synchronize the transmission of the elevation and bearing message to within $\pm 10$ $\mu$s. This necessitates a synchronization device with an adequate pass band of roughly more than 20 KHz. Connection 21 between synchronization device 20 of the bearing station, which transmits a synchronizing pulse under the control of control electronics 19 at the start of the elevation preamble and a synchronization receiver 22, to the elevation station STS is generally a coaxial cable. The sync receiver 22 generally comprises a threshold circuit at $-6$ dB, which transmits a reference pulse to the elevation station, determining the start of the transmission of the elevation angular scan information message by the elevation station. This connection can also be provided by radio waves, in which case devices 20 and 22 are replaced by a transmitter and a receiver. The frequency of this radio link can be of a random nature and in particular equal to the receiver of the MLS station in question. In this case, the receiver of the elevation station, on receiving the elevation preamble transmission PRS from the STZ station, will use this information as a reference pulse and in this case the transmitter is in the STZ station.

This connection can also be in the form of pairs of stranded conductors or optical fibers. In the latter case, the amplifiers of devices 20 and 22 are replaced by light-emitting diodes and photodiodes.

Figure 6:
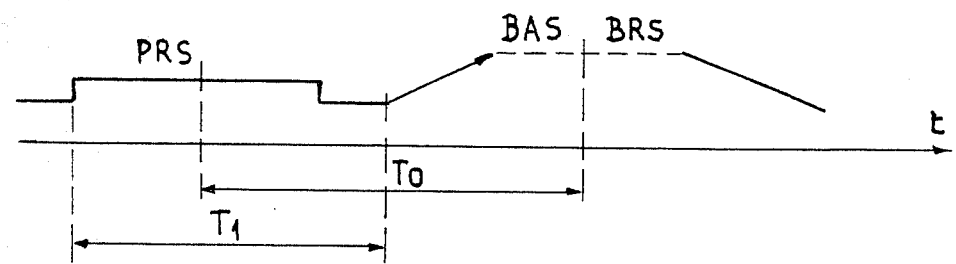
FIG. 6 a schematic representation defining the times T0 and T1.

The operation of the elevation station STS is simplified compared with a prior art station because certain elements are eliminated, namely the phase modulator, the antenna switch and the sector antenna transmitting the elevation preamble, which is transmitted by the bearing station. The sync receiver 22 is modified in the manner indicated hereinbefore. The control electronics 190 are also simplified because, according to the invention, the preamble generating part thereof is eliminated. In the case where a microprocessor is used, it is the corresponding logic part which is eliminated. Reference must also be made to another modification to the control electronics 190 of the elevation station and this relates to the delay to the starting of the outward electronic scan and then the return of the angular information with respect to the elevation preamble transmitted by the bearing station. The time To separating the two following successive events has been defined hereinbefore: time reference of the preamble constituted by the phase transition 0-1 of the Barker code 11101 and the middle of the outward and return scans of the elevation electronic scan antenna, said time To being shown in FIG. 6. The time T1 separating the rising front of the elevation preamble from the start of the elevation scan is introduced. The values of To and T1 are defined by international standards on MLS. The control electronics 190 of the elevation station comprise either a logic counter, or a counter programmed in the microprocessor used, which defines the value T1, to within a correction $\Delta t$ explained hereinafter. The counter is wired or programmed to value $T1 - \Delta t$.

Thus, the delay in the transmission of the synchronization must be taken into account and compensated. A relatively simple calculation can be provided in the case of a transmission by coaxial cable 21. The cable is used in a matched transmission line of characteristic impedance Zo. On the basis of the equations of the lines, it is known that the propagation velocity V in the line is given by:

$$v = \frac{1}{\sqrt{ek}} = \frac{Z_o}{e} = \frac{1}{Z_o k}$$

in which Zo is the characteristic impedance of the line, e is its capacitance per unit length and k the line inductance. In general, the propagation velocity in a standardized cable is approximately $\frac{2}{3}$ of the velocity of electromagnetic waves in air.

Figure 7:
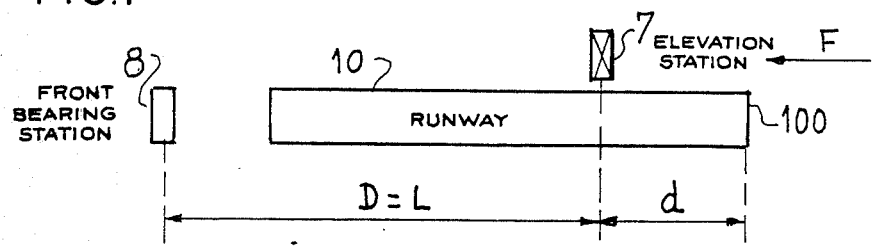
FIG. 7 a schematic representation of the organization of the MLS in which account is taken of the length of the connecting cable transmitting the synchronizing pulse of the transmission of the elevation preamble.

If the elevation and bearing stations are spaced by a distance D, e.g. of approximately 4 kilometers, which corresponds to an approximately 4 kilometer runway, the length L of the connecting cable is at least 4 kilometers. FIG. 7 shows this situation in which is shown the runway 10, the starting threshold 100, the landing direction F, the elevation station 7 and the bearing station 8.

An aircraft located at the start of the runway receives the elevation message with a different propagation time with regard to the premable and angular information. The times are referenced at the bearing station:

the preamble transmitted by the bearing station is propagated in air for a time:

$$t_4 = \frac{D + d}{c}$$

the angular information transmitted by the elevation station and controlled, according to the invention, by the bearing station by synchronization connection 21 (FIG. 4) thus propagates both on the cable and in the air for a time $$t_5 = L/v + d/c$$

d being (FIG. 7) the distance between the elevation station 7 and the start of the runway and c the velocity of the electromagnetic waves in air.

The differential propagation time $\Delta t = t_5 - t_4$ can lead to a corresponding error on the value $t_1$ as defined hereinbefore (FIG. 6):

$$\Delta t = t_5 - t_4 = L/v - D/c$$

In the considered numerical example, for $L = D = 4$ km and $v = \frac{2}{3} c$, we find $\Delta t = 6.7$ $\mu s$. However, higher values can be found if $L > D$, where the path of the cable is not direct. This value $\Delta t$ can be compensated by advancing the synchronization control (circuit 22) by an equivalent value $\Delta t$ on leaving the bearing station. This can be brought about by means of a counter or shift register, which corresponds to delaying by a value $\Delta t$ the transmission of the preamble by the bearing station compared with the transmission time of the synchronization pulse for the elevation station. Another solution, which is generally preferred, consists of shortening of the counting time in the elevation station, so that instead of counting T1 for the previously defined time interval, the elevation station will count the interval $T1 - \Delta t$, as stated hereinbefore.

Figure 8:
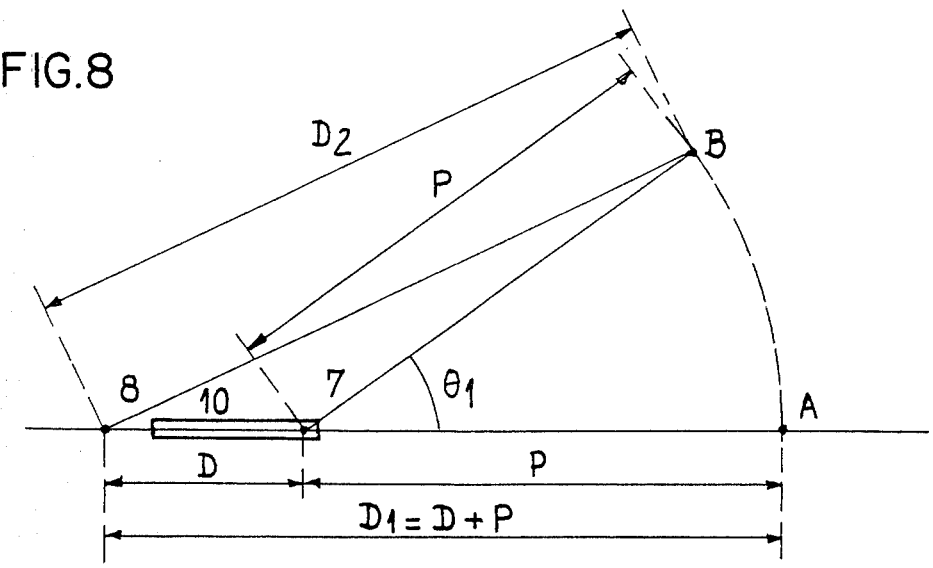
FIG. 8 a schematic representation of the system for two different positions of the aircraft using it.

As a function of the position of the aircraft in the coverage of the system, a differential propagation delay $\Delta t'$ can appear, in addition to the delay $\Delta t$ referred to hereinbefore and which is now assumed to be compensated for an aircraft at the start of the runway. FIG. 8 shows such a case, where an aircraft can assume two positions A and B with respect to the bearing station 8 and elevation station 7.

The coverage of the MLS in question forms a bearing angle $\theta 1$, e.g. of approximately $\pm 40°$. The oblique distance between the elevation station 7 and point B is $P = 20$ NM $= 37$ km distance. It is assumed hereinafter that the elevation antenna and start of the runway coincide, their spacing d in the considered example being approximately 250 m, which is negligible here.

For an aircraft in position at point A, the bearing angle is $0°$. Assuming that the distance D between the elevation and bearing stations is approximately 4 Km, its distance from the bearing station is $D_1 = P + D = 41$ km.

For an aircraft in position at point B, the bearing angle is $\theta 1 = 40°$ and a simple geometrical calculation shows that its distance from the station is then $D_2 = 40.1$ km.

$$D_2^2 = D^2 + P^2 - 2DP \cos 140°$$

Thus, between positions A and B of the aircraft, there is a differential distance of $\Delta d = D_1 - D_2 = 0.9$ km corresponding to the propagation of the electromagnetic waves with a differential delay $\Delta t'$:

$$\Delta t' = \Delta d/C = 3 \ \mu s$$

This delay $\Delta t'$ cannot be compensated in the ground equipment, because it varies in the MLS coverage. However, it remains well below the tolerance $\pm 10$ $\mu s$ on To or T1 of the international standards.

Hereinbefore, reference has been made to the errors which can be considered on time T1 which, according to the invention, separates the rising front of the elevation preamble transmitted by the bearing station and the start of the outward and return elevation scan transmitted by the elevation station under the control of the bearing station. These errors occur with the same value in time $T_o$. These errors are the realization error of the bearing-elevation synchronization connection of approximately ±5 μs in the considered example, the error due to the differential propagation at the ground Δt compensated in the ground equipment, i.e. equal to 0 and the differential propagation error in air Δt' of approximately ±3 μs. Thus, on forming the balance of these errors, it can be seen that in all they remain below the limit accepted by international standards.

A preferred embodiment of the invention has been described hereinbefore in which the elevation preamble is transmitted by the bearing station.

It is also possible to envisage the bearing preamble being transmitted by the elevation station, which thus becomes the master station and the bearing station becomes the slave station. However, such an organization has the disadvantage, particularly if the elevation and bearing stations are relatively remote from one another, that the bearing information is not available all along the runway, through the absence of a preamble.

At the start of this description, reference has been made to the possibility of transmitting basic data and/or auxiliary data. Such data are generally transmitted by the bearing station using the same circuits as for transmitting the bearing preamble PRZ. However, it is also possible to use a data station separate from the bearing station for transmitting such data. Under these conditions, there are three instead of two stations, namely a bearing station, an elevation station and a data station.

In this case, according to the invention, it is the data station which transmits on the one hand the basic and/or auxiliary data provided by the MLS format and on the other hand the preambles of the bearing and elevation functions. The data station then serves as the master station with the two synchronization connections, one towards the bearing station and the other towards the elevation station.

Figure 9:
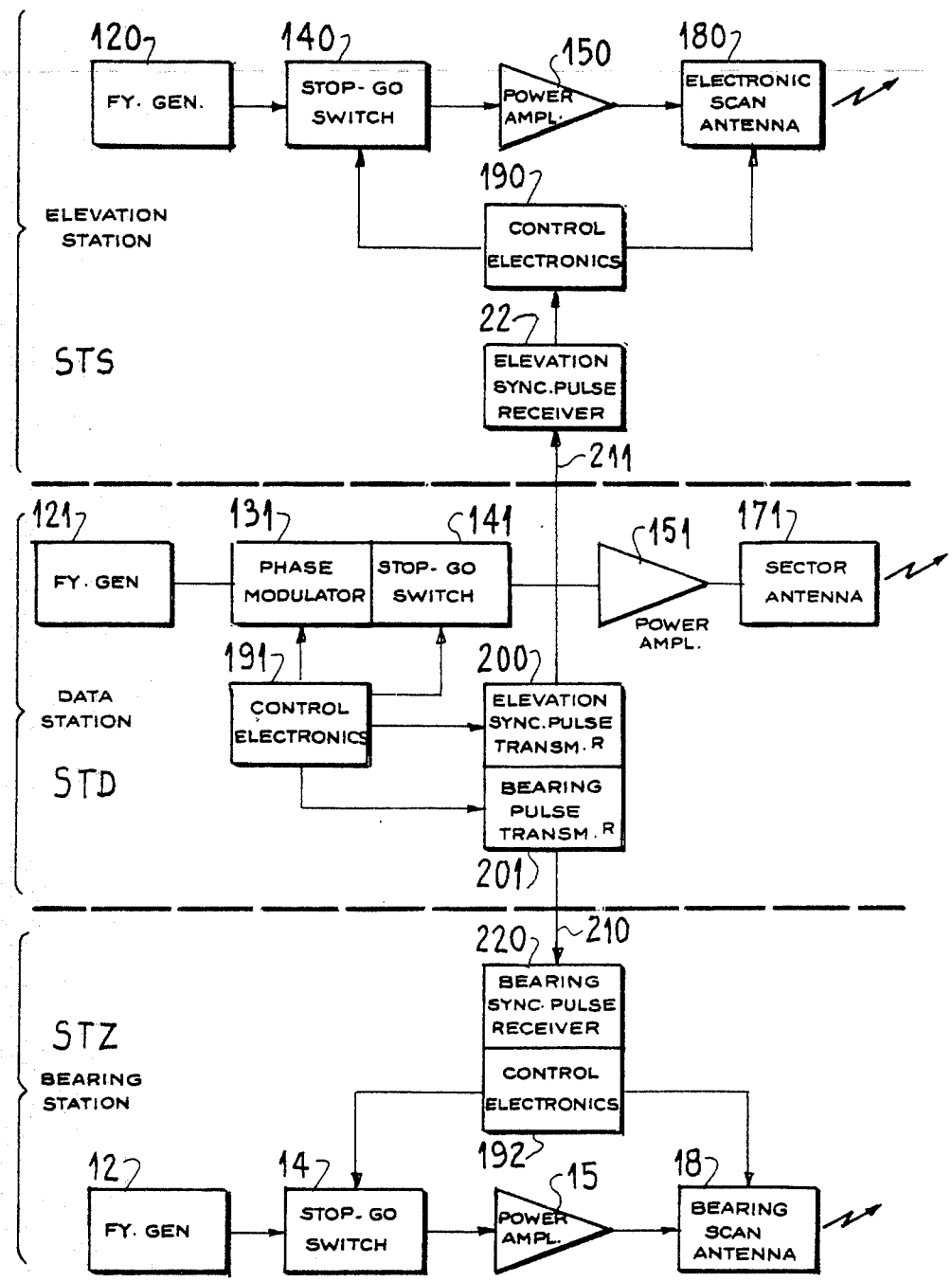
FIG. 9 a schematic representation of the device according to the invention with three stations.

FIG. 9 very diagrammatically shows the organization of the device according to the invention when three stations are envisaged, namely a bearing station STZ, an elevation station STS and a data station STD. In this case, the data station STD is the master station and the bearing and elevation stations are the slave stations.

The different stations and in particular the elevation and bearing stations, do not differ from the elevation station shown in FIG. 4, so that the main numerical references used in FIG. 4 are also used in FIG. 9, when they designate similar circuits.

The bearing station STZ of FIG. 9, which is in this case a slave station, comprises the following circuits: a frequency generator 12 followed by a stop-go switch 14 and a power amplifier 15 supplying the bearing scan antenna 18. A control electronics 192 controls switch 14 and antenna 18 under the control of a bearing sync reception circuit 220, which receives from the master station, which is in this case the data station STD, a synchronizing pulse by means of channel 210 indicating that the preamble of the bearing message has been transmitted, so that the bearing station can transmit the specific bearing information.

The elevation station STS comprises the same circuits as the bearing station, i.e. a frequency generator 120 followed by a stop-go switch 140 and a power amplifier 150 connected to the elevation scan antenna 180.

A control electronics 190 controls switch 140 and antenna 180 under the control of an elevation sync reception circuit 22. This circuit receives from the master data station via channel 211 a synchronizing pulse indicating that the preamble of the elevation message has been transmitted and that the elevation station can now transmit the specific elevation message.

The data station comprises the following circuits: a frequency generator 121 followed by a phase modulator 131, a stop-go switch 141, a power amplifier 151 and a sector antenna 171. According to the invention, the phase modulator generates the preambles of the data, bearing and elevation messages, under the control of the control electronics 191, which controls the stop-go switch 141.

According to the invention, the control electronics 191 controls the transmission of synchronizing pulses by circuits 200 and 201 for informing the elevation and bearing stations respectively that the preambles of their messages have been transmitted. As indicated hereinbefore, these pulses are received in elevation station STS and bearing station STZ by receiver circuits 22 and 220 respectively. It should be noted that the data message is transmitted by the sector antenna 171.

The data station is generally located in the vicinity of the bearing station, so as to ensure a reception of the data and the preambles on the runway.

FIG. 10 gives a time-based schematic representation of the different signals transmitted by the three stations of a MLS according to the invention. FIGS. 10a, 10b1 and 10b2 are identical to FIGS. 5a, 5b1 5b2 described hereinbefore and FIGS. 10d1, 10d2 and 10d3 represent the signals transmitted according to the invention in the case of three stations.

Figure 3A:
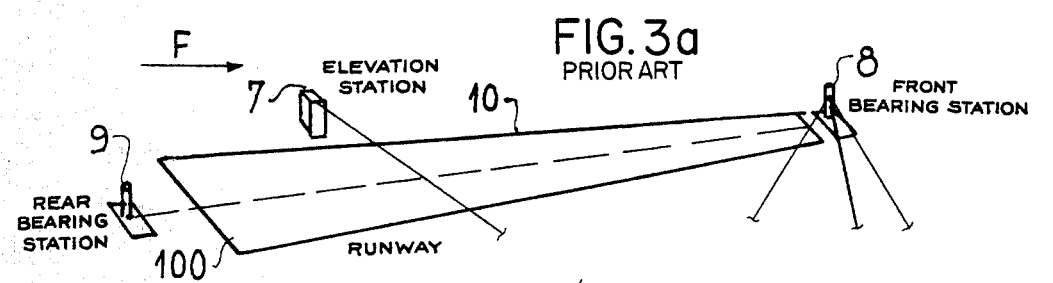
Figure 3B:
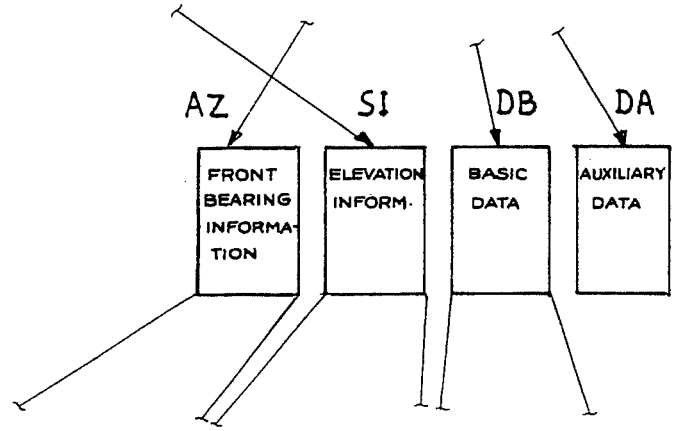
Figure 3C:
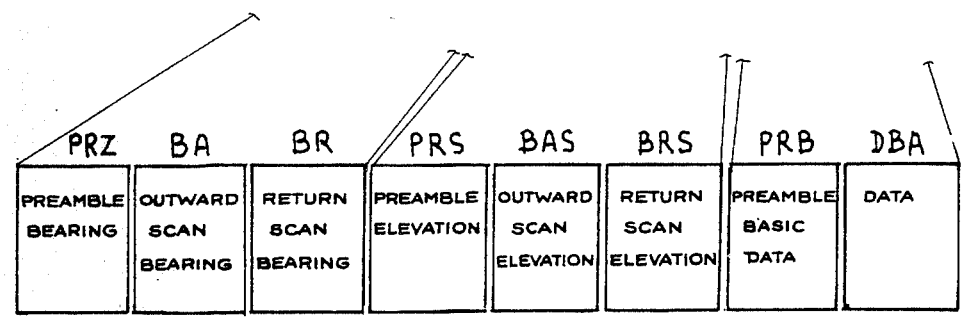

FIG. 10d1 shows signal D transmitted by the data station and successively comprising preamble PRZ of the bearing function, preamble PRS of the elevation function and finally the basic data DB constituted by a preamble PRB and the actual data DBA. FIG. 10d2 shows the signal AZ transmitted by the bearing station with the synchronizing pulse TS coming from the data station and FIG. 10d3 shows signal SI transmitted by the elevation function with synchronizing pulse TS also coming from the data station. In the case of the bearing station (FIG. 10d2), time T1 becomes T'1 defined by international standards.

Thus, a microwave landing system with separate elevation and bearing stations has been described in which one of the stations is a master station and the other a slave station. A microwave landing system comprising three stations, one being the master station and the two others slave stations has also been described.

What is claimed is:

1. A method for transmitting messages of an aircraft microwave landing system (MLS), said MLS comprising at least an elevation station separated from an azimuth station;
   said MLS furnishing azimuth and elevation data to an aircraft with respect to an approachiing runway, by transmitting an azimuth message and an elevation message, each of said messages containing, in sequence, a preamble, and a specific part; said preamble identifying whether said specific part relates to elevation or azimuth data;
   said method comprising the following steps:
   transmitting a message by a first of said stations in addition to the peamble of a message from a second station, in further addition to a synchronization signal to be utilized by said second station; and transmitting a specific part of a message by said second station immediately after transmission of its preamble by said first station.

2. A method for transmitting messages of a microwave landing system (MLS), said MLS comprising at least three separated stations, e.g., an elevation station, an azimuth station and a data station;

said MLS furnishing azimuth and elevation angle and data to an aircraft in relation to an approaching runway, by transmitting an azimuth message, and elevation message and a data message;

each of said messages containing, in sequence, a preamble and a specific part; said preamble characterizing said specific part;

said method comprising the following steps:

transmitting a message by a first station in addition to the preamble of a message from second and third stations, in further addition to a synchronization signal, successively utilized by said second and third stations;

transmitting a specific part of a message by said second station immediately after the transmission of its preamble by said first station;

transmitting a specific part of a message by said third station immediately after the transmission of its preamble by said first station.

3. The method according to claim 1 or 2, wherein said first station is said azimuth station.

4. The method according to claim 2, wherein said first station is said data station.

5. The method according to claim 1 or 2, wherein said synchronization signal is transmitted by said first station towards another station at the beginning of the preamble of the message of said other station, and wherein the duration ($T_1$) between the beginning of the preamble of the other station and the specific part is dependent upon when said other station receives said synchronization signal.

6. The method according to claim 5, wherein said duration ($T_1$) is corrected by a value $\Delta t$ which is a function of:

a differential propagation duration between the preamble transmitted by the first station and the specific part transmitted by said other station;

a synchronization signal propagation duration between said first station and said other station.

7. The method according to claim 6, wherein said corrected value occurs by anticipating the duration $\Delta t$ of the synchronization signal transmission by said first station.

8. The method according to claim 6, wherein said corrected value occurs in said other station by subtracting said value $\Delta t$ from said duration ($T_1$).

9. An MLS according to claim 1 or 2, comprising a plurality of stations, wherein said first station comprises at least a sector antenna for transmitting said preambles; and a synchronization device for transmitting said synchronization signal; and further wherein each of the stations transmitting azimuth or elevation specific parts further includes at least an electronic scan antenna for transmitting said specific part, and a synchronization receiver connected to an electronic control device for controlling the station, said control device further comprising counting means and means for controlling specific part transmission.

* * * * *